Patented Oct. 5, 1926.

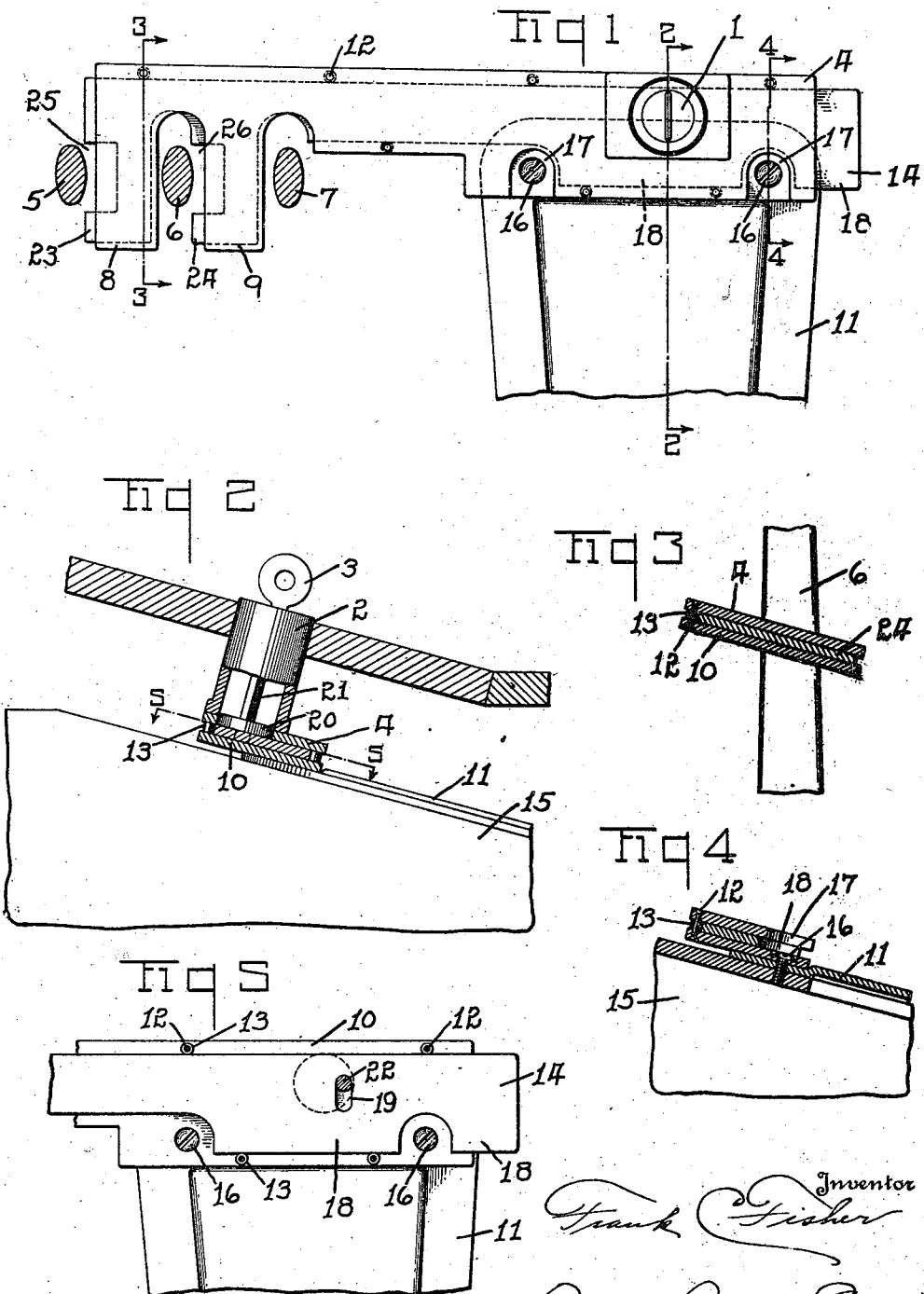

1,602,192

UNITED STATES PATENT OFFICE.

FRANK C. FISHER, OF TOLEDO, OHIO, ASSIGNOR TO THE BRYAN SCREW MACHINE PRODUCTS COMPANY, OF BRYAN, OHIO, A CORPORATION OF OHIO.

AUTOMOBILE LOCK.

Application filed February 2, 1925. Serial No. 6,279.

My invention has for its object to provide a locking means for locking the pedal levers of an automobile that may be readily attached to some permanent or fixed part of the machine, preferably by the utilization of a securing member constituting a standard part or one commonly used in securing parts of the automobile together. By my invention is provided the means for covering or locking the member that is thus utilized for securing the lock in position, so that it cannot be unfastened and consequently rendering the lock non-removable, practically, when the parts of the lock are placed in locking position. In the preferred embodiments of my invention the locking means is attached to the engine casing by the screws that may be also used for securing the cover plate of the ordinary Ford automobile. A locking plate is operated by the rotation of an ordinary lock barrel to engage one or more of the pedal levers commonly used in Ford automobiles for controlling or actuating the machine, and which will at the same time cover the screw heads used for securing the cover plate and locking means in position and so that a screw driver or other tool cannot be used for removing the plate from its engaging relation with the pedal levers, when the plate is in its locking position.

The invention may be contained in structures which in their details vary from each other. To illustrate a practical application of the invention, a structure containing the invention is selected as an example of such structures and shall be described hereinafter. The structure selected is shown in the accompanying drawing.

Figure 1 of the drawing illustrates a top view of the locking means, the pedal levers being shown in sections, and the cover plate of a Ford automobile being shown broken. Fig. 2 illustrates a view of a section taken on the line 2—2 indicated in Fig. 1. Fig. 3 illustrates a view of a section taken on the line 3—3 indicated in Fig. 1. Fig. 4 illustrates a view of a section taken on the line 4—4 indicated in Fig. 1. Fig. 5 illustrates a view of a section taken on the line 5—5 indicated in Fig. 2.

As shown in the drawing the locking means may be provided with an ordinary lock barrel 1 supported in the usual shell 2 and operated by a key 3. The shell 2 is secured to a plate 4 that extends laterally to the pedal levers 5, 6, and 7 of the automobile. The pedal lever 5 is for producing low and high speeds in the driving shaft; the pedal lever 6 is for reversing the car at a relatively low speed and the pedal lever 7 is for operating the brake in the manner well known in connection with the operation of Ford automobiles. The plate 4 may be provided with a key shaped end having prong like portions 8 and 9 that extend between the levers 5, 6, and 7. A second plate 10 having substantially the same shape and dimensions, likewise extends laterally from the cover plate 11 of the engine to the pedals and is provided with forked portions that lie between the pedals 5, 6 and 7. The plates 4 and 10 are secured together by means of the rivets 12, and are spaced apart by means of the collars 13 that surround the rivets 12. Within the space between the plates 4 and 10 is located a locking plate 14 which conforms somewhat to the shape of the plates 4 and 10. The dimensions of the plate 14 are such that it may readily slide along opposite side edges of the plates 4 and 10, and so that the plate 14 may be readily shifted within the frame thus formed.

The plate 10 is secured to the engine casing 15 by means of the screws 16 that are ordinarily used for securing the cover plate 11 to the engine casing. The plate 4 is provided with notches or openings 17 through which the screws 16 may be inserted and screwed into the engine shell while the shiftable plate 14 may be provided with protruding portions 18 for covering the heads of the screws 16 and closing the openings or notches 17 of the plate 4 and thus preventing access to the screws by means of a tool to unscrew the screws from the engine shell or casing when the plate 14 has been shifted.

The plate 14 is provided with a slot 19 while the barrel 1 of the lock is connected to a disc 20 by means of a rod 21, and the disc 20 is provided with a pin 22 that protrudes into the slot 19. When therefore the barrel of the lock is rotated by the key 3 the disc 20 will be rotated and the pin 22 will cause the plate 14 to be shifted laterally between the plates 4 and 10. The plate 14 is provided with prong like portions 23 and 24 that lie beneath the prong like portions 8 and 9 of the plate 4 and between portions of the plates 4 and 10. The prong like portions 23 and 24 are provided with recesses 25 and 26 so formed that when the plate 14 is shifted by the operation of the key 3 the pedal levers 5 and 6 will be engaged by the portions 23 and 24 and thus the pedal levers will be locked from movement from the positions that they occupy when the car is standing still. When the plate 14 is in position to lock the pedal levers 5 and 6 it will also be in position, such that its portions 18 will cover the screws 16. Thus the pedal levers will be securely locked in the positions in which they are placed when the car is brought to a stand still.

I claim:

In a lock for an automobile lever a key rotatable barrel member, a slidable member having a projection for engaging the lever to prevent movement of the lever, the said slidable member moved by the barrel member, a frame formed of a pair of plates located in spaced relation to each other for guiding the said slidable member and for supporting the barrel member, means for securing the frame to a part of the automobile, the slidable member having portions covering the said means to prevent disconnection of the frame from the said part.

In testimony whereof I have hereunto signed my name to this specification.

FRANK C. FISHER